US007123596B2

(12) United States Patent
Fukui (10) Patent No.: US 7,123,596 B2
(45) Date of Patent: Oct. 17, 2006

(54) TIME SCHEDULING WITH SAW ARQ PROCESS

(75) Inventor: Noriyuki Fukui, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 125 days.

(21) Appl. No.: 10/866,664

(22) Filed: Jun. 15, 2004

(65) Prior Publication Data

US 2005/0083880 A1    Apr. 21, 2005

(30) Foreign Application Priority Data

Jun. 16, 2003    (EP)    ................................. 03291448

(51) Int. Cl.
    *H04B 7/212*    (2006.01)
(52) U.S. Cl. ........................ 370/329; 455/464; 370/338
(58) Field of Classification Search ................ 455/442, 455/450, 67.11; 370/325, 335, 349, 428, 370/230, 338, 401, 394, 329; 714/748
    See application file for complete search history.

(56) References Cited

U.S. PATENT DOCUMENTS

| 6,021,124 A | 2/2000 | Haartsen |  |
|---|---|---|---|
| 6,097,961 A | 8/2000 | Alanara et al. |  |
| 2002/0080719 A1* | 6/2002 | Parkvall et al. | ............. 370/235 |
| 2004/0032853 A1* | 2/2004 | D'Amico et al. | ............ 370/349 |
| 2004/0085934 A1* | 5/2004 | Balachandran et al. | ...... 370/335 |
| 2004/0219920 A1* | 11/2004 | Love et al. | .................. 455/442 |
| 2004/0223507 A1* | 11/2004 | Kuchibhotia et al. | ........ 370/428 |
| 2004/0224697 A1* | 11/2004 | Hakkinen et al. | ............ 455/450 |
| 2005/0250454 A1* | 11/2005 | Sebire et al. | ............ 455/67.11 |
| 2006/0045010 A1* | 3/2006 | Baker et al. | ................ 370/230 |

FOREIGN PATENT DOCUMENTS

WO    WO 01/48958    7/2001

OTHER PUBLICATIONS

David Haccoun, et al., "Node to Node Protocols on a High Speed Full-Duplex Satellite Link", NTC. Conference Record, XP-002085779, Dec. 3, 1978, pp. 2811-2815.

* cited by examiner

Primary Examiner—Eliseo Ramos-Feliciano
Assistant Examiner—Michael T. Vu
(74) Attorney, Agent, or Firm—Oblon, Spivak, McClelland, Maier & Neustadt, P.C.

(57) ABSTRACT

The process for sending sets of data on a uplink dedicated transport channel made of successive sub-frames from a mobile station to a base station of wireless communication network, said process including:
  implementing a SAW ARQ process in which each set of data to be transmitted is split into packets which are transmitted in following sub-frames and a next packet is transmitted only when a response for the previous packet is received by the mobile station.

It includes:
  defining several SAW channels, made of a sub-set of sub-frames regularly time spaced in the uplink dedicated transport channel;
  for each set of data, assigning a primary channel to said set of data, and
  sending the packets of said set of data in the sub-frames of said assigned primary channel by implementing a SAW ARQ process in the primary channel.

10 Claims, 6 Drawing Sheets

TIME SCHEDULING WITH SAW ARQ PROCESS

BACKGROUND OF THE INVENTION

1. Field of the Invention

The present invention concerns a method for sending sets of data on an uplink dedicated transport channel made of successive sub-frames from a mobile station to a base station of wireless communication network 2. Discussion of the Background In a wireless communication system, the data are transmitted on up-link dedicated transport channels (DCH) from the mobile station to the base station.

In UMTS standard, the 3 GPP ($3^{rd}$ Generation Partnership Project) is studying how to enhance uplink Dedicated Transport Channel. The goal and assumption of the study are disclosed in technical report TR 25.896 version 0.3.0 "Uplink Enhancements for Dedicated Transport Channels".

Since the use of IP based services becomes more important, there is an increasing demand to improve the coverage and throughput as well as to reduce the delay of the uplink. Applications that could benefit from an enhanced uplink may include services like video-clips, multimedia, e-mail, telematics, gaming, video-streaming etc.

Scheduling of mobile station transmissions is considered by 3 GPP to support Enhanced Uplink Dedicated Transport Channel.

In TR 25.896 version 0.3.0, two approaches are mentioned: rate scheduling and time scheduling. Moreover, a hybrid scheme of these approaches is considered.

In rate scheduling, uplink transmissions are executed in parallel and each transmission rate is controlled. Therefore, transmission rate should be low enough. It means that the transmission power of mobile stations is restricted.

In time scheduling, the number of mobile stations that are allowed to transmit are restricted at any given time. The transmission power of mobile stations is also restricted in case of time scheduling, even if it is higher than in case of rate scheduling for avoiding to impact on other channels.

In section 7.2.2 of TR 25.896 version 0.3.0, it is mentioned that multiple stop-and-wait (SAW) hybrid Automatic Repeat Request (ARQ) process can be used for achieving the transmission of data.

In single SAW ARQ process, after a mobile station transmits a data packet, it never transmits a next data packet until receiving a response (ACK or NACK) for the packet transmitted. Therefore, there is time duration in which nothing is transmitted.

Multiple SAW ARQ overcomes this inefficient use. In this multiple SAW ARQ, several SAW ARQ processes operate in parallel.

When the scheduling is done, noise rise (interference level) should be considered. The noise level (mainly interference) must be lower than certain level to keep a high quality defined by the bit error rate, the block error rate and so on.

When a channel resource is assigned to a new mobile station, the transmission power of any given mobile station interferes with other mobile stations as noise. This phenomenon should be taken into account for scheduling. Also, permitted transmission power (equal to permitted transmission rate) to a new mobile station is decided based on remaining quantity up to maximum permitted noise rise.

In 3 GPP discussion, the characteristic of SAW ARQ process is not considered for the scheduling at the moment. When the mobile station uses only one SAW ARQ process, there is no transmission during the period waiting a response. For instance, if the transmission timing from several mobile stations is the same, the noise rise becomes high in specific sub-frames and does not exist in other sub-frames.

Moreover, the rate scheduling needs to set a margin when it decides maximum transmission power of each mobile station as considering the case that all mobile stations transmit at the same time.

SUMMARY OF THE INVENTION

The aim of the invention is to propose a method for time scheduling in stop-and-wait (SAW) hybrid Automatic Repeat Request (ARQ) processes which allows more power to be assigned to each mobile station and or which allows channel resources to be assigned to more mobile stations.

BRIEF DESCRIPTION OF THE DRAWINGS

The invention will be better understood on reading the description which follows, given merely by way of example and while referring to the drawings in which.

DESCRIPTION OF THE PREFERRED EMBODIMENTS

Figure 1:
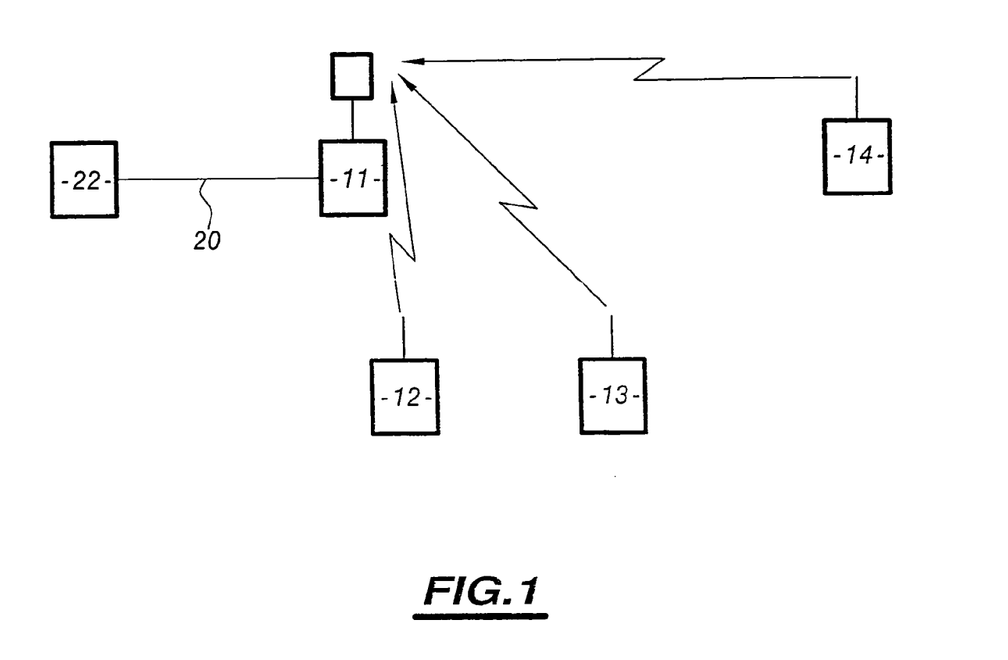
FIG. 1 is a schematical view of a wireless telecommunication network.

A part of a cellular network is shown on FIG. 1.

The cellular network is assumed to be according to UMTS (Universal Mobile Telecommunications Systems) standard as defined by 3 GPP. This standard applies a WCDMA modulation scheme.

Each cell comprises a base station 11. Each base station is adapted to communicate with mobile stations 12, 13 which are in the cell containing the base station and with mobile stations 14 which are in the soft handover regions of the adjacent cells.

The base stations are linked together through a physical network 20.

A Radio Network Controller 22 (RNC) is connected to the base stations through the network 20. The Radio Network Controller is in charge of the Radio Resource Management (RRM) algorithm. In particular, it is adapted to control the UTRAN.

Uplink transmissions are carried out from a mobile station to a base station. The downlink transmissions are from the base station to the mobile stations.

A stop-and-wait (SAW) hybrid Automatic Repeat Request (ARQ) process is implemented for transmitting the data from the mobile station to the base station, that is to say in the uplink direction.

According to such a process, the data on the Dedicated Transport Channel (DCH) is devised in sub-frame size which is used in physical layer. Transmission unit length of SAW ARQ is equal to sub-frame length.

Figure 2:
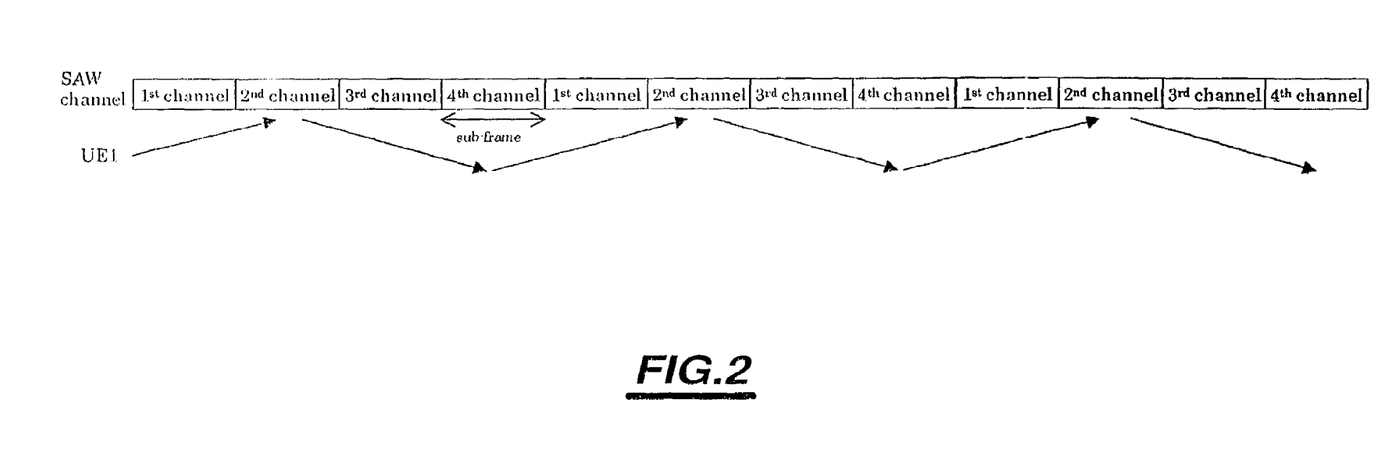
FIG. 2 is a schematical view of a dedicated transport channel showing a SAW hybrid ARQ process.

In the example of FIG. 2, physical layer structure consists of four SAW channels. The data on the DCH is thus divided in four SAW channels. Each sub-frame corresponds to a Transmission Time Interval (TTI). The TTI is assumed to have 10 ms duration. The transport channel data is separated into small size packets such that each packet can be inserted into a TTI.

SAW Hybrid ARQ process is defined in TR25.896 version 0.3.0.

Accordingly, a data frame or a data packet is sent from a mobile station to a base station during a sub-frame of a SAW channel.

The base station having received the data frame sends a response. If the data frame is correctly received, an ACK response is sent. If the data frame is corrupted, a NACK response is sent. The next data frame is sent by the mobile station only when an ACK or a NACK response has been received. If a NACK response is received, the previous sent data frame is sent again. If an ACK response is received the following data frame is sent.

Figure 3:
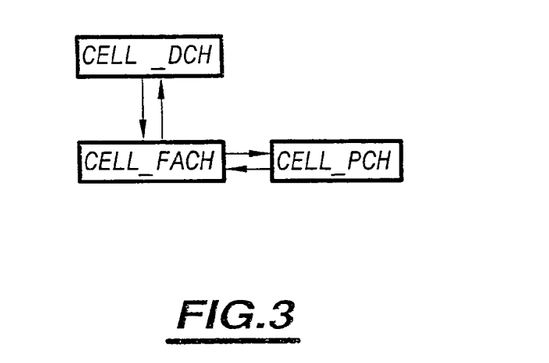
FIG. 3 is a schematical view showing the connection state model for a mobile station.

A fundamental concept in WCDMA is the connection state model, illustrated on FIG. 3. The connection state model enables optimization of radio and hardware resources depending on the activity level of each mobile station.

Users with high transmission activity (in either uplink, downlink or both) should be in CELL_DCH state, where power-controlled dedicated channels are established to/from the mobile station. In CELL_DCH state, the mobile station is assigned dedicated radio and hardware resources, which minimizes processing delay and allows for high capacity.

Users with low transmission activity should be in CELL_FACH state, where only common channels are used. The major advantages with CELL_FACH state are the possibility for low mobile station power consumption and that no dedicated hardware resources in the Node B are needed.

Users with no transmission activity are in CELL_PCH or URA_PCH states, which enable very low mobile station power consumption but do not allow any data transmission. These states are not discussed further in this section.

Switching between CELL_DCH and CELL_FACH are controlled by the RNC based on requests from either the network or the mobile station. Entering CELL_DCH implies the establishment of a DCH.

Figure 4:
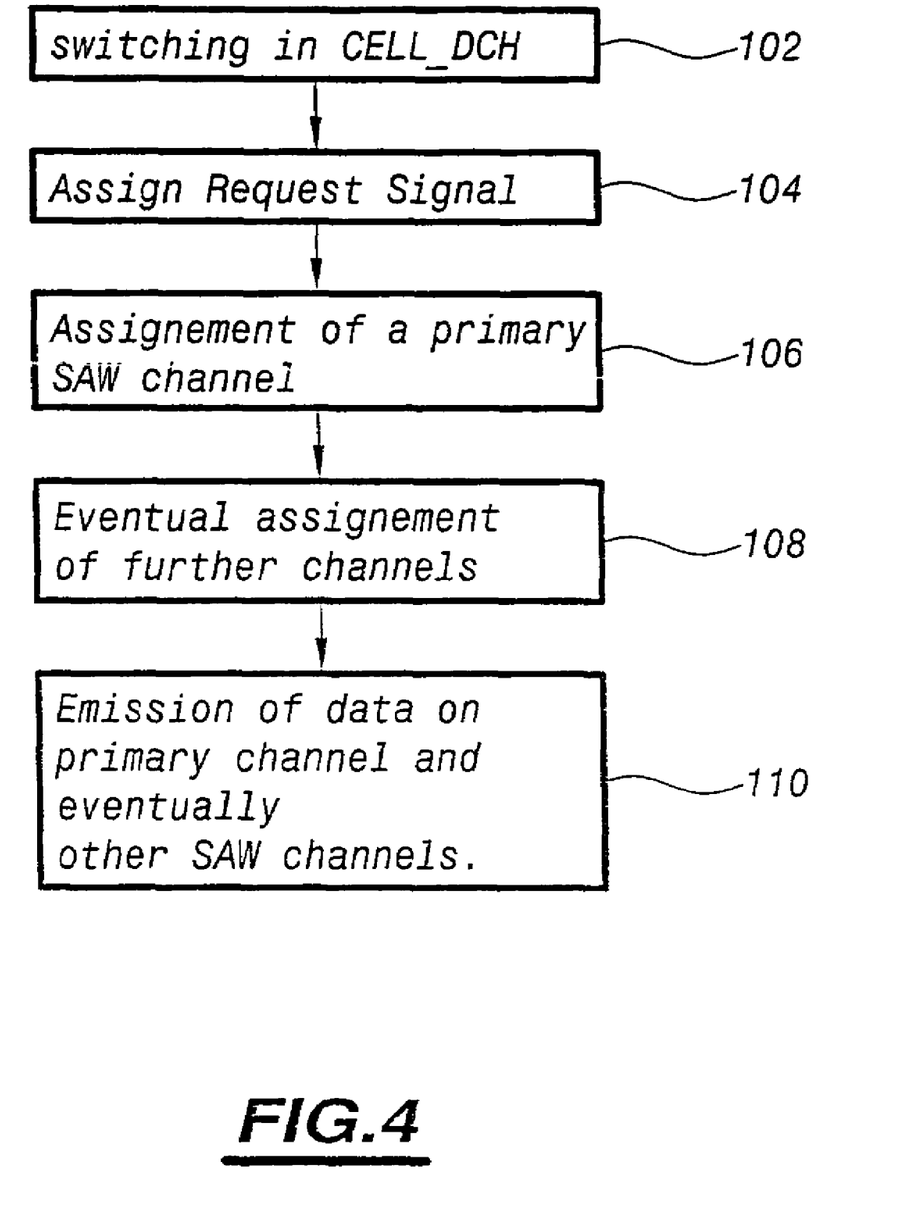
FIG. 4 is a flowchart of the process for sending data on an uplink dedicated transport channel according to the invention.

The algorithm for the transmission process is disclosed on FIG. 4.

According to the invention, the algorithm is implemented when a mobile station is switched to CELL_DCH state, at step 102 and a DCH is established.

More precisely at step 104, an Assign Request signal is sent by the mobile station to the base station.

A primary channel is assigned at step 106. The primary channel is made of sub-frames regularly time spaced in the DCH. More precisely, let $SFN_i$ being the system frame number of the $i^{th}$ sub-frame of a primary channel and $SFN_j$ being the system frame number of the $j^{th}$ sub-frame of the same primary channel thus $$SFN_i \% N = SFN_j \% N$$

Where % is modulo function, and
N is the number of SAW channels in the DCH. Primary channel consists in SFN timings which have a same value after module calculation.

According to a first embodiment, the base station checks current noise rise situation of each SAW channel and selects the SAW channel for which the noise rise is the lowest, as being the primary channel.

Figure 5:
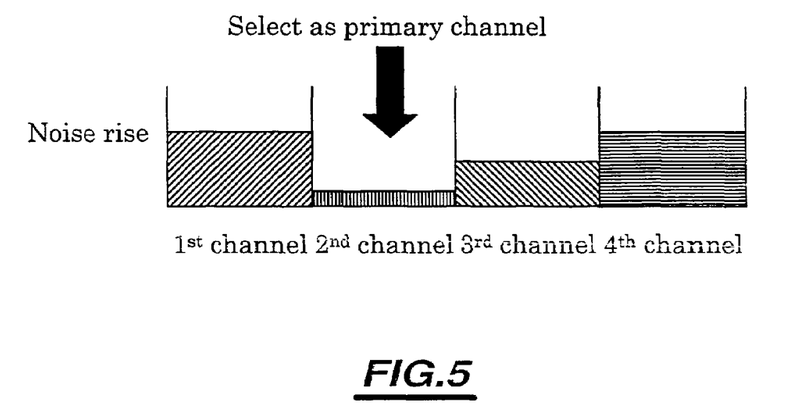
FIG. 5 is a chart showing the noise rise for several SAW channels.

As shown on FIG. 5, the total noise rise of each SAW channel is the sum of the noises produced by the mobile stations using the same uplink SAW channel. In that case, the second SAW channel is selected as being the primary channel.

For assigning the primary channel to the mobile station, the base station sends to the mobile station the System Frame Number (SFN) of the next sub-frame of the SAW channel to be used by the mobile station.

Figure 6:
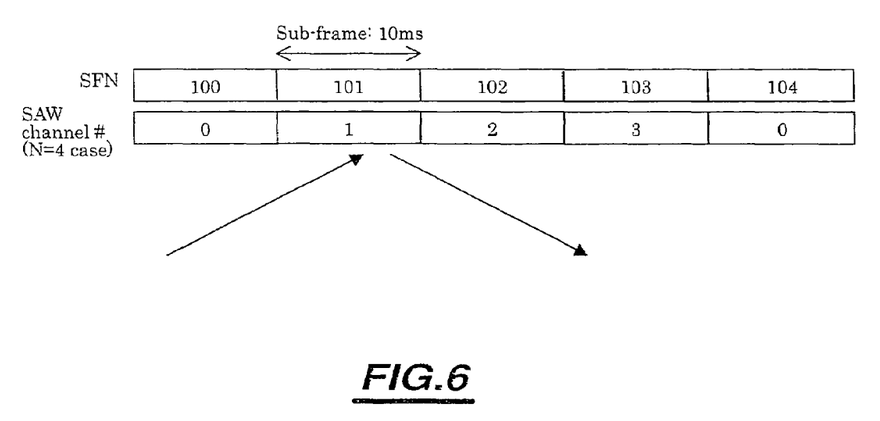
FIG. 6 is a schematical view of a dedicated transport channel explaining the process according to the invention when applied with SAW channel of 10 ms with a first method for determining the primary channel.

FIG. 6 shows an example in which the sub-frame has a duration of 10 ms. A sub-frame is a 10 s length TTI with the meaning of 3 GPP.

More precisely, the base station signals to the mobile station the SFN in which first transmission should be done.

In that case, the primacy channel is the SAW channel 1 and the system frame number of the first sub-frame to be used by the mobile station is signalled by sending 101% 4 in case of N=4. Thus, 1 is sent to the mobile station. In another implementation, the SFN which should be first used by the mobile station is really sent. In that case, for example, 105 or 109 is sent.

Alternatively, an offset value from a specific timing is sent by the base station to signal the primary channel. For example, the offset between the assign request signal sent by the mobile station and the next sub-frame of the primary channel to be used is sent by the base station to inform the mobile station of the primary channel timing.

If the rate requested for the data to be sent is very high, more than one SAW channel may be assigned by the base station to the mobile station at step 108.

The maximum number of SAW channels may be defined. The number is decided based on the data rate requested by the mobile station. The other SAW channels which are allocated, are signalled to the mobile station.

The definition of maximum of SAW channels restricts the number of mobile station that a base station has to receive simultaneously at certain sub-frame. This is very efficient for receiver usage at cells.

In order to reduce the number of information sent by the base station, it is possible to signal only a maximum number of channels which is assigned in addition to the primary channel under the assumption that consecutive channels are allocated. Thus, the number of bits for signalling is reduced.

After the primary channel and eventually further SAW channels are assigned, the packets of data are emitted by implementing multiple SAW ARQ processes at step 110 first in the sub-frames of the primary channel and eventually in the sub-frames of further assigned SAW channels.

An example is shown on FIG. 2. In that case, the primary channel is the second SAW channel and thus the data frames are sent firstly in the sub-frames of the second SAW channel when the mobile station starts transmission in no transmission state.

Since the timing of primary channel is intentionally assigned by monitoring of the situation of noise rise, noise rise at every SAW channels can be flat. It means that the variance of noise rise becomes keen as shown by line 702 in FIG. 7. Therefore, more power can be assigned to each mobile station or channel resource can be assigned to a higher number of mobile stations.

Figure 7:
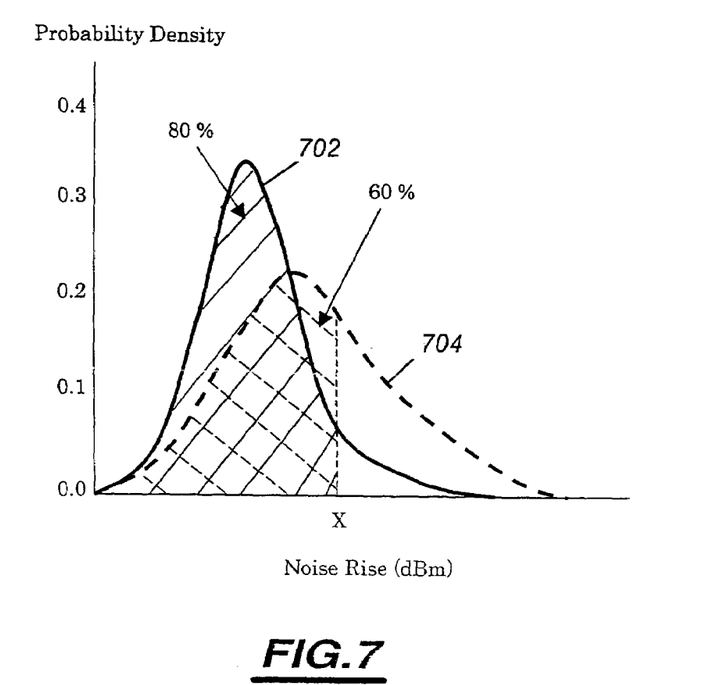
FIG. 7 is a curve showing the probability density versus the noise rise for two different processes.

FIG. 7 explains the reason why the scheduler has to set a margin. Line 704 shows the case in which high power is assigned to each mobile station, without implementing the invention. Then, if the maximum permitted noise rise is X dB and outage (probability which noise rise exceeds X dB) is 20%, the case described by line 704 can't maintain the outage because several mobile stations often transmit at the same time.

According to another implementation of the invention, the mobile stations which request low transmission rate or low power are assigned to the same primary channel. The requested transmission rate or the power are compared with a predetermined threshold and a same primary channel is assigned to all the mobile stations requesting a transmission rate or a power which is lower than the threshold. As shown on FIG. 8, the first SAW channel is used for a lot of mobile stations needed few resources.

Figure 8:
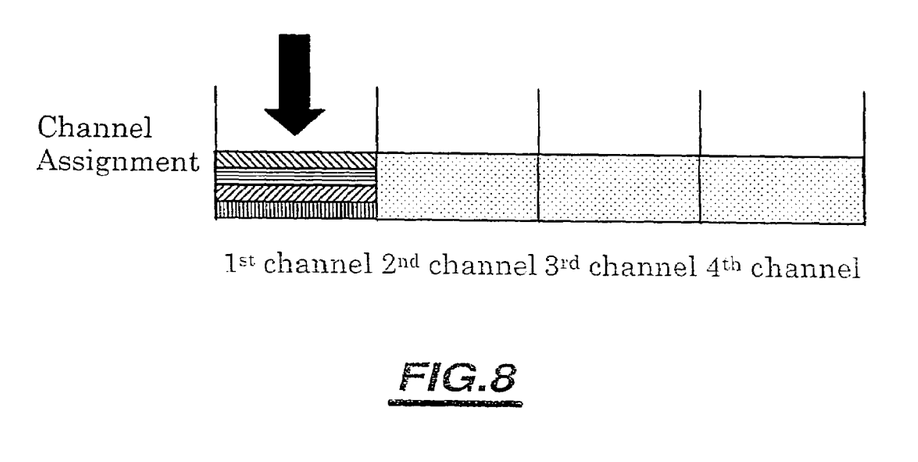
FIG. 8 is a chart showing the noise rise for several SAW channels.

Thus, it is possible to have many channels which have much room to maximum noise rise. Therefore, even if a next mobile station requests high transmission rate or high power, it is easy to assign the channel according to its request.

According to still another implementation, the primary channel is selected by some calculation made by the mobile station based on the receiving time of the response to the assign request signal from the mobile station. The SAW channel number $N_{PC}$ to be used as primary channel is defined according to the system frame number SFN of the sub-frame denoted $SFN_r$ which has been used for sending the response to the Assign Request by the base station. The SAW channel number $N_{PC}$ is given by the following formula $$N_{PC} = SFN_r \% N$$

Where % is modulo function; and

N is the number of SAW channels.

Connection Frame Number (CFN) can be used instead of System Frame Number (SFN).

Figure 9:
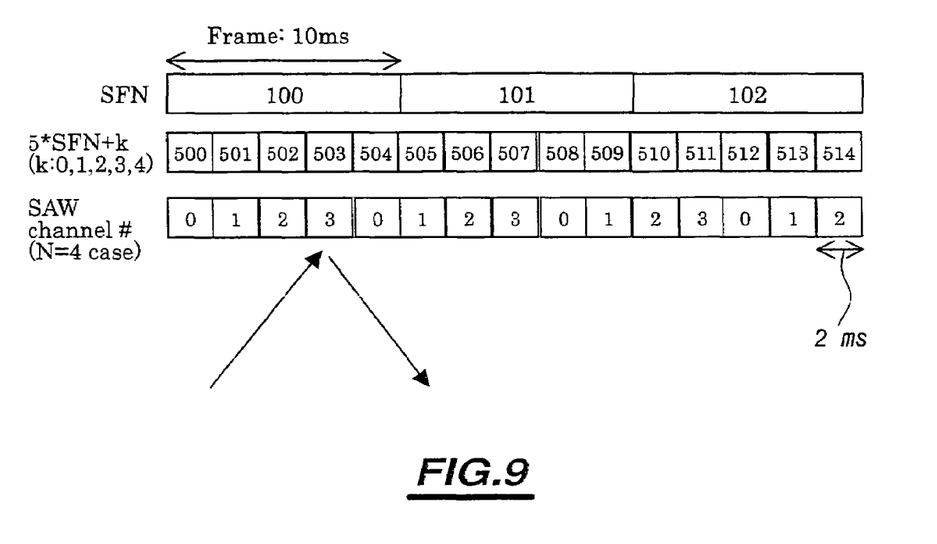
FIG. 9 is a schematical view of a dedicated transport channel explaining the process according to the invention when applied with SAW channel of 2 ms.

According to another implementation of the invention, the sub-frames of the Dedicated Transport Channel (DCH) have a 2 ms length as shown on FIG. 9.

As explained in the previous example, the primary channel is defined by the mobile station based on the receiving time of the response to the Assign Request.

Since the duration of the sub-frame is only 2 ms and the duration of a frame is 10 ms, the primary channel $N_{PC}$ is given by $$N_{PC} = (5 \times SFN + k)_r \% N$$

where $(5 \times SFN + k)_r$ is the sub-frame number at receiving time of the response to the assign request; and % is the modulo function.

According to a last implementation, the primary channel is selected by some calculation based on the user identification number (UE-ID) assigned to the mobile station by the base station. This decision way can be done to the mobile station independently of existence of an assign request. Therefore, this can be applied for mobile station autonomous transmission system.

For example, the primary channel $N_{pc}$ among the SAW channels is defined according to the following formula:

$$N_{PC} = UE\text{-}ID \% N$$

Where UE-ID is the identification number of the mobile station;

% is the modulo function; and

N is the number of SAW channels.

With such a process, non-scheduling cells in soft handover area can know the transmission timing from the interested mobile station by same calculation. Therefore, the receiving by several cells becomes possible without signalling between cells.

In addition, if several cells in soft handover do scheduling, same channel, i.e. same transmission timing is assigned to the interested mobile station. Therefore, several cells have only to receive the data from the mobile station at the timing assigned. If the assigned timing is different among cells, they always have to be ready to receive because the final decision at the mobile station for transmission can not be known by each cell. This is waste of the receiver at cells.

In case that certain calculation carried out by the mobile station only is used to decide primary channel like in both last cases, only "OK" or "NG" response to assign request is informed to the mobile station because the mobile station can calculate the primary channel by itself.

Whatever could be the way for determining the primary channel, the variance of noise rise is made keen as disclosed on FIG. 7. Indeed, the obtained advantages are the same if the timing of the primary channel is differently assigned for each mobile station by using a calculation based on "SFN % N" or on "UE-ID % N" or if the timing of the primary channel is intentionally decided by monitoring the situation of noise rise.

The invention claimed is:

1. A process for sending plural sets of data on an uplink dedicated transport channel including successive sub-frames from a mobile station to a base station of a wireless communication network, said process comprising:

implementing a SAW ARQ (stop-and-wait Automatic Repeat Request) process in which each set of data to be transmitted is split into packets that are transmitted in sub-frames, and a next packet is transmitted only when a response for a previous packet is received by the mobile station;

defining plural SAW channels, each SAW channel including a sub-set of sub-frames regularly time spaced in the uplink dedicated transport channel;

for each set of data, assigning a primary channel to the respective set of data; and sending the packets of the respective set of data in the sub-frames of the assigned primary channel by implementing the SAW ARQ process in the primary channel.

2. A process according to claim 1, wherein, for transmitting a set of data, the mobile station first sends an assign request signal to the base station, and upon receipt of the assign request signal the base station assigns the primary channel to the mobile station, and sends the assigned primary channel to the mobile station.

3. A process according to claim 2, wherein the base station determines noise rise of each SAW channel of the dedicated transport channel, and for each new set of data to be transmitted by a mobile station the base station assigns the SAW channel having the lowest noise rise as the primary channel.

4. A process according to claim 3, wherein the base station determines transmission rate or power used by each mobile station, and the base station assigns the same primary channel to all the mobile stations having a transmission rate or power that is lower than a predetermined threshold.

5. A process according to claim 2, wherein for identifying the assigned primary channel, the base station sends to the mobile station a Frame Number of the sub-frame in which the first transmission should be done or an offset value between a predetermined time known by the mobile station and the sub-frame in which the first transmission should be done.

6. A process according to claim 1, wherein the primary channel is determined by the mobile station based on a predetermined rule.

7. A process according to claim 6, wherein the mobile station determines the primary channel as a function of an identification number of the mobile station.

8. A process according to claim 6, wherein, for transmitting a set of data, the mobile station first sends an assign request signal to the base station, and upon receipt of the assign request signal, the base station returns a response, and the mobile station determines the primary channel as a function of the receiving time of the response to the assign request signal.

9. A process according to claim 1, wherein at least a further SAW channel is assigned to the mobile station for transmission of the set of data in addition to the primary channel.

10. A wireless communication network of at least a base station and several mobile stations, the network comprising:
  means for implementing a SAW ARQ (stop-and-wait Automatic Repeat Request) process for sending a set of data on an uplink dedicated transport channel including successive sub-frames from a mobile station to a base station, each mobile station including means for splitting the set of data into packets to be transmitted in sub-frames of the dedicated transport channel, the mobile station configured to transmit a next packet only when a response for a previous packet is received by the mobile station;
  means for defining plural SAW channels including a sub-set of sub-frames regularly time spaced in the uplink dedicated transport channel;
  means for assigning, for each set of data, a primary channel to each respective set of data; and
  wherein the mobile station includes means for sending the packets of the set of data in the sub-frames of the assigned primary channel by implementing the SAW ARQ process in the primary channel.

* * * * *